United States Patent
Wang et al.

(10) Patent No.: US 11,787,547 B2
(45) Date of Patent: Oct. 17, 2023

(54) ICING DETECTION USING TEMPERATURE DATA FROM AN EXTERNAL DATA SOURCE

(71) Applicant: Honeywell International Inc., Charlotte, NC (US)

(72) Inventors: Haifeng Wang, Beijing (CN); Jing Song, Beijing (CN)

(73) Assignee: Honeywell International Inc., Charlotte, NC (US)

(*) Notice: Subject to any disclaimer, the term of this patent is extended or adjusted under 35 U.S.C. 154(b) by 314 days.

(21) Appl. No.: 17/181,964

(22) Filed: Feb. 22, 2021

(65) Prior Publication Data

US 2022/0267014 A1     Aug. 25, 2022

(51) Int. Cl.
    *B64D 15/20*     (2006.01)
    *G01S 13/95*     (2006.01)
    *B64D 45/00*     (2006.01)

(52) U.S. Cl.
    CPC ............ *B64D 15/20* (2013.01); *G01S 13/953* (2013.01); *B64D 2045/0085* (2013.01)

(58) Field of Classification Search
    CPC ............ B64D 15/20; B64D 2045/0085; G01S 13/953; G01S 7/003; G08G 5/0008; G08G 5/0013; G08G 5/0021; G08G 5/0052; G08G 5/0091; H04B 7/18504; G01W 1/02
    See application file for complete search history.

(56) References Cited

U.S. PATENT DOCUMENTS

| | | | |
|---|---|---|---|
| 5,028,929 A | 7/1991 | Sand et al. | |
| 5,488,375 A | 1/1996 | Michie | |
| 6,489,915 B1 | 12/2002 | Lines et al. | |
| 7,109,913 B1* | 9/2006 | Paramore | G01S 13/953 342/182 |
| 7,982,658 B2 | 7/2011 | Kauffman et al. | |
| 8,159,369 B1* | 4/2012 | Koenigs | G01S 13/953 340/963 |
| 8,711,008 B2* | 4/2014 | Cook | G01K 13/02 340/963 |
| 9,244,166 B1 | 1/2016 | Finley et al. | |
| 9,720,082 B1* | 8/2017 | Dana | G01S 7/062 |
| 9,864,055 B1* | 1/2018 | Sishtla | B64D 15/20 |
| 9,897,695 B2 | 2/2018 | Vacanti | |
| 9,972,917 B2 | 5/2018 | Vacanti et al. | |
| 10,151,834 B2 | 12/2018 | Wang et al. | |

(Continued)

OTHER PUBLICATIONS

Extended Search Report from counterpart European Application No. 22154822.5 dated Jul. 11, 2022, 7 pp.

*Primary Examiner* — Adnan Aziz
(74) *Attorney, Agent, or Firm* — Shumaker & Sieffert, P.A.

(57) ABSTRACT

In some examples, a system includes a receiver configured to receive temperature data for a region of airspace from a data source external to the vehicle. The system also includes processing circuitry configured to determine one or more moisture values for the region of airspace based on radar returns received by a weather radar onboard the vehicle. The processing circuitry is further configured to determine a potential for icing at a location within the region of airspace based on the one or more moisture values and further based on the temperature data received from the data source. The processing circuitry is also configured to generate an output based on the determined potential for icing at the location.

18 Claims, 6 Drawing Sheets

(56) References Cited

U.S. PATENT DOCUMENTS

| | | | |
|---|---|---|---|
| 10,184,405 B1* | 1/2019 | Veres | F01D 25/02 |
| 10,494,108 B1* | 12/2019 | Finley | B64D 43/00 |
| 10,700,767 B2 | 6/2020 | Wang et al. | |
| 10,725,169 B2 | 7/2020 | Goossen et al. | |
| 10,914,830 B2 | 2/2021 | Vacanti et al. | |
| 2013/0234884 A1* | 9/2013 | Bunch | G01S 13/953 |
| | | | 342/26 B |
| 2014/0197982 A1 | 7/2014 | Wang et al. | |
| 2016/0274271 A1* | 9/2016 | Lukas | G01W 1/02 |
| 2017/0272148 A1* | 9/2017 | Wang | G01S 13/951 |
| 2018/0047294 A1* | 2/2018 | Esposito | G08G 5/0008 |
| 2018/0074189 A1* | 3/2018 | Khatwa | G01W 1/02 |
| 2018/0149745 A1 | 5/2018 | Christianson et al. | |
| 2019/0277964 A1 | 9/2019 | Badin et al. | |
| 2020/0386884 A1* | 12/2020 | Dillard | G01S 7/06 |

* cited by examiner

ICING DETECTION USING TEMPERATURE DATA FROM AN EXTERNAL DATA SOURCE

TECHNICAL FIELD

This disclosure relates to weather detection.

BACKGROUND

Icing is a severe weather hazard to the safety of aircraft and other vehicles because icing can affect the performance of engines, sensors, and other components onboard a vehicle. Icing can impair the mechanical performance of a vehicle, making it more difficult for an operator to control the vehicle. In the aviation context, ice can cover the surface of an aircraft, increasing fuel consumption because of the effect of the ice on the aerodynamics of the aircraft. Icing can reduce the speed of travel, thereby increasing the travel time and travel costs.

SUMMARY

In general, this disclosure relates to detecting conditions for icing in the atmosphere based on temperature data received from an external data source. The detection of potential icing conditions can also be based on the estimated moisture value in the atmosphere. Responsive to detecting icing conditions, a system of this disclosure may be configured to generate an output indicating the potential icing conditions, such as a graphical user interface to be presented on a display or a data packet to be transmitted to an external system (e.g., back to the data source).

The temperature data received from an external data source may be more accurate for detecting icing conditions at remote locations than the ambient temperature sensed by an onboard sensor. For example, the external data source may be able to generate temperature data for locations that are tens or hundreds of kilometers away from the onboard sensor. The freezing altitude at the latitude and longitude of the onboard sensor may be significantly different than the freezing altitudes at remote locations. Thus, estimating the freezing altitude based an onboard temperature measurement may be less accurate than the temperature data from an external data source.

In some examples, a system includes a receiver configured to receive temperature data for a region of airspace from a data source external to a vehicle. The system also includes processing circuitry configured to determine one or more moisture values for the region of airspace based on radar returns received by a weather radar onboard the vehicle. The processing circuitry is further configured to determine a potential for icing at a location within the region of airspace based on the one or more moisture values and further based on the temperature data received from the data source. The processing circuitry is also configured to generate an output based on the determined potential for icing at the location. The system may be configured to mount on the vehicle.

In some examples, a method includes receiving, at a system onboard a vehicle and from a data source external to the vehicle, temperature data for a region of airspace. The method also includes determining, by the system, one or more moisture values for the region of airspace based on radar returns received by a weather radar onboard the vehicle. The method further includes determining, by the system, a potential for icing at a location within the region of airspace based on the one or more moisture values and further based on the temperature data received from the data source. The method includes generating an output based on the determined potential for icing at the location.

In some examples, a device includes a computer-readable medium having executable instructions stored thereon, configured to be executable by processing circuitry for causing the processing circuitry to determine, based on radar returns received by a radar system onboard a vehicle, one or more moisture values for a region of airspace. The instructions are configured to be executable by the processing circuitry for further causing the processing circuitry to determine a potential for icing at a location within the region of airspace based on the one or more moisture values and further based on temperature data received by the radar system from a data source external to the vehicle. The instructions are configured to be executable by the processing circuitry for also causing the processing circuitry to generate an output based on the determined potential for icing at the location.

The details of one or more examples of the disclosure are set forth in the accompanying drawings and the description below. Other features, objects, and advantages will be apparent from the description, drawings, and claims.

DETAILED DESCRIPTION

Various examples are described below for determining a potential for icing based on temperature data received from an external data source. The potential for icing may exist in the travel path of a vehicle, and a vehicle operator may maneuver the vehicle to avoid regions with the potential for icing. Therefore, an accurate prediction of the potential for icing at a remote location in the travel path of a vehicle may help a driver or a pilot safely operate the vehicle, for example, by maneuvering around a location that has the potential for icing.

The determination that a location has the potential for icing can be based on the moisture at the location and further based on the temperature at the location. For example, an existing system can estimate the temperature at a location based on an ambient temperature sensed by a sensor onboard an ownship vehicle. If the ambient temperature is negative ten degrees Celsius, the system can estimate the freezing altitude at approximately three thousand feet below the vehicle using a lapse rate of three degrees per one thousand feet. The existing system can estimate the moisture content at the location based on radar returns from the location. Using these two parameters (e.g., temperature and moisture), the system can determine the potential for icing at the location.

In contrast, a system of this disclosure may be configured to determine the potential for icing based on temperature data received from an external data source. The temperature data received from the external data source may include a three- or four-dimensional dataset, where the four-dimensional dataset may include temperature forecasts for various latitudes, longitudes, and altitudes at one or more times in the future. The temperature data received from the external data source may be more accurate for a remote location than an estimate of temperature that is based on a temperature sensor that is mounted onboard the vehicle. For example, the freezing altitude at the latitude and longitude of the vehicle may be different than the freezing altitude several hundred kilometers away from the vehicle because altitude-temperature profiles may vary by location and across time.

Figure 1:
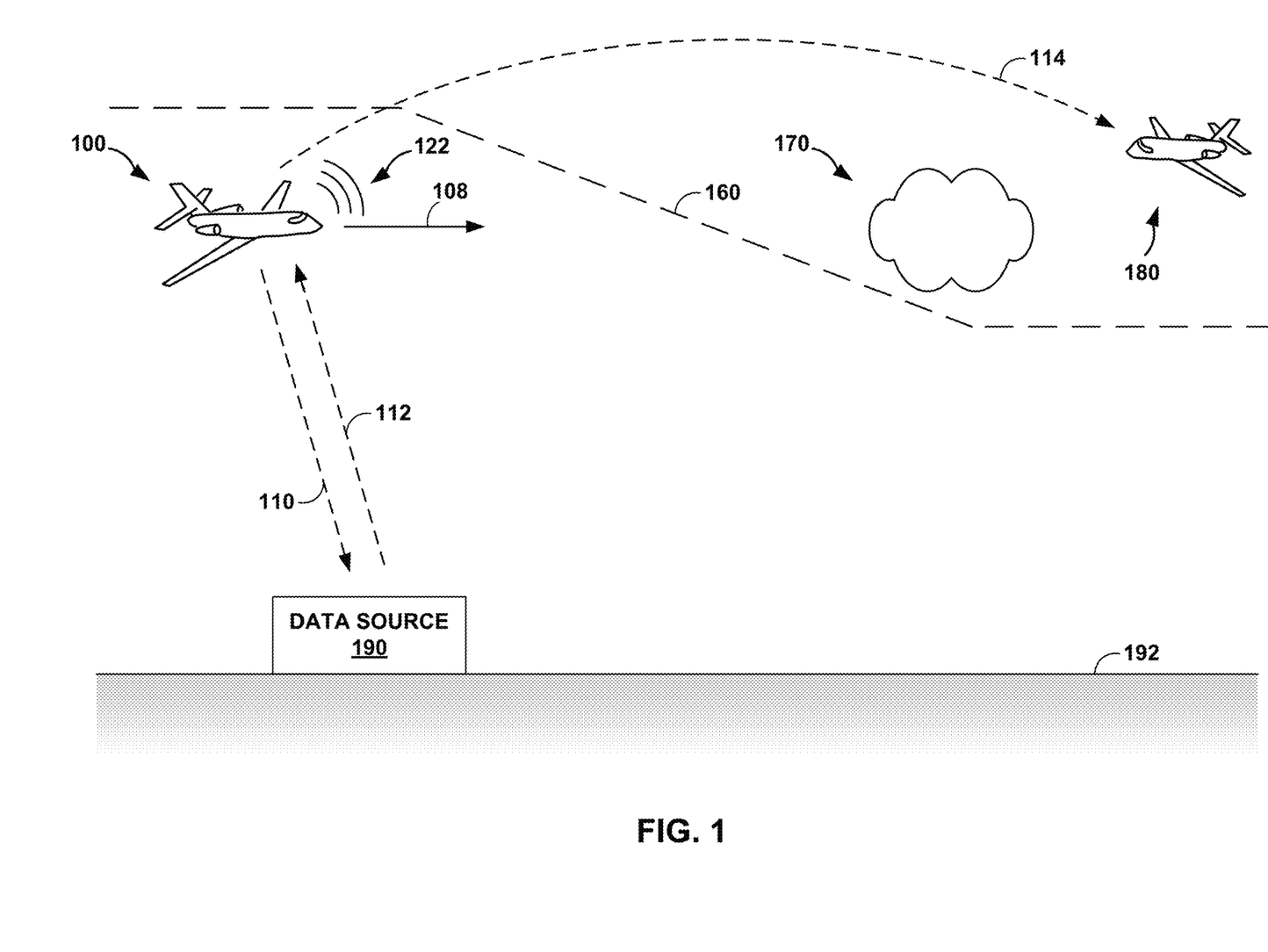
FIG. 1 is a conceptual diagram of a vehicle receiving temperature data from an external data source, in accordance with some examples of this disclosure.

FIG. 1 is a conceptual diagram of a vehicle 100 receiving temperature data 112 from a data source 190, in accordance with some examples of this disclosure. FIG. 1 depicts vehicles 100 and 180 as airplanes, but vehicles 100 and 180 may include any mobile object or remote object with any that receives, transmits, or stores weather data, such as temperature data, moisture data, and/or reflectivity data. In other examples, vehicles 100 and 180 may include an aircraft such as a helicopter or a weather balloon. In yet other examples, vehicles 100 and 180 may include a land vehicle such as an automobile or a water vehicle such as a ship or a submarine.

Vehicle 100 may include a radar configured to transmit and receive weather radar signals to collect weather data from a region of airspace including location 170, where the region of airspace may represent a three-dimensional volume of space that is within range of a radar of vehicle 100. In some examples, location 170 may be identified by a point in space defined by latitude, longitude, and altitude. As will be explained in greater detail below, the latitude, longitude, and altitude information may be used to define spheres, cylinders, cubes, or other three-dimensional volumes (e.g., voxels or cells) corresponding to location 170.

The radar onboard vehicle 100, as well as a radar system of data source 190, may be configured to store the moisture data (e.g., reflectivity values) in a buffer including volumetric weather data. Each moisture value stored in the buffer may be associated with a cell or voxel that represents a volume of space. The moisture values may be referred to as weather data, reflectivity values, or radar return values. Each moisture value may represent the reflectivity of a location or region, which may be indicative of the moisture content at that location or in that region. The radar systems of vehicle 100 and/or data source 190 may be configured to store these values to memory and update the values as the systems receive new data.

In the example of FIG. 1, data source 190 may transmit and receive signals, data, and/or messages with vehicle 100 through a wireless communication channel (e.g., a data link such as a controller pilot data link). For example, data source 190 can transmit temperature data 112 to vehicle 100 in response to request 110 or as an unprompted message. Vehicle 100 may be configured to send request 110 to data source 190 for temperature data 112, where request 110 may include data indicating the location and/or travel path of vehicle 100. Additionally or alternatively, data source 190 may already have access to this information because data source 190 may store data indicating the locations and travel paths of the vehicles that are within communication range of data source 190.

In the example of FIG. 1, location 170 includes a cloud or other moisture in the air. Location 170 is at an altitude above freezing altitude 160, so the moisture at location 170 may include ice crystals and/or super-cooled liquid water. In some examples, ice crystals and/or super-cooled liquid water may be present at altitudes below freezing altitude 160 because gravity can cause the ice crystals and/or super-cooled liquid water to fall from a higher, colder altitude to an altitude below freezing altitude 160. Ice crystals may present an issue for modern engines with extremely fine tolerances. Super-cooled liquid water may present a potential for icing on the surfaces of vehicles, which can affect aerodynamics.

Two factors can affect the formation of icing: the moisture and the temperature in the air. In the troposphere close to the earth, the air temperature decreases as altitude increases. When the temperature is below zero and there is sufficient moisture, icing may occur. An icing detection system onboard vehicle 100 can classify the icing severity level at location 170 into one of five categories: heavy, moderate, light, trace, and null. One potential source of icing information is the Numerical Weather Prediction, which uses a meteorological mathematical model along with the moisture and temperature in the air the predict the potential for icing. Another potential source of icing information is reports from vehicle operators who traveled through the icing area.

A radar onboard vehicle 100 may transmit radar signals 122, and the moisture at location 170 may reflect some of radar signals 122 back to vehicle 100. The radar onboard vehicle 100 may be configured to perform continuous scanning of an entire volume ahead of vehicle 100. The reflected radar signals may include return echoes from a target such as a cloud, a water droplet, a particle, or a molecule within location 170. Vehicle 100 may process the reflected radar signals to determine the reflectivity for multiple data points within location 170.

As described in further detail herein, a system onboard vehicle 100 can process and store the radar returns in a three-dimensional volumetric weather buffer that includes cells or voxels. The cells or voxels each represent a volume of space, which may be rectangle-shaped or cube-shaped. In some examples, the sides of each voxel may be flat, curved, square-shaped, and/or rectangle-shaped. At longer ranges (e.g., distances from vehicle 100), the voxels of the buffer may be larger. The data stored in a particular voxel provides an estimate of the moisture content associated with the volume represented by the particular voxel. Location 170 may be associated with one of the voxels within the weather buffer, and the moisture value associated with that particular voxel may represent the amount of moisture at location 170.

To determine the potential for icing at location 170, an existing system can use one or more moisture values associated with location 170 and an estimated temperature at location 170. The existing system can estimate the temperature at location 170 based on an ambient temperature at the ownship vehicle. Using the estimated temperature and moisture at location 170, the system can determine the potential for icing at location 170. However, determining an estimate of the temperature at location 170 based on the ambient temperature at a remote location may be less accurate than temperature data 112 received from data source 190. This may be especially true for remote locations that are hundreds of kilometers away from the vehicle. In some examples, location 170 may be at least ten, twenty, fifty, one hundred, two hundred, or three hundred kilometers away from vehicle 100.

Another existing system may use icing information from a numerical weather prediction model, but this model may provide only low-resolution icing predictions. A low-resolution prediction may cause a vehicle operator to avoid a large region, even when only a portion of the region has the potential for icing. The large region may include areas with insufficient moisture for ice formation. This existing system may also use reports from other vehicle operators, but operator reports may provide an incomplete or subjective picture of the icing potential in a region. Moreover, operator reports can become out-of-date within a few hours.

In accordance with the techniques of this disclosure, a system onboard vehicle 100 may be configured to combine temperature data 112 received from data source 190 with moisture data collected by a radar system onboard vehicle 100 to determine the potential for icing at location 170. Temperature data 112 may be received from data source 190 at regular intervals (e.g., one or more times per hour) during a flight of vehicle 100 and/or in response to request 110. Using regularly updated three- or four-dimensional temperature data, the system onboard vehicle 100 can more accurately determine icing potential at long ranges, especially since freezing altitude 160 near vehicle 100 may be different than freezing altitude 160 tens or hundreds of kilometers away from vehicle 100.

The use of temperature data 112 and moisture values from an onboard weather radar may increase the accuracy of the icing determinations made by vehicle 100. In examples in which the operator of vehicle 100 has access to a more accurate determination of the potential for icing, the operator may be more aware of which regions pose an icing threat and which regions do not. The operator can avoid icy regions, thereby reducing fuel consumption and reducing operating costs. Vehicle 100 and data source 190 can share the real-time icing determinations with other stakeholders, such as vehicle 180 and traffic control systems to improve safety and efficiency for other vehicles.

Data source 190 may be configured to transmit temperature data 112 during a flight of vehicle 100, where temperature data 112 may include the most recently measured or estimated temperatures at a plurality of locations including location 170. Data source 190 may include or receive data from a weather data provider such as the National Oceanic and Atmospheric Administration or the Aviation Weather Center. Data source 190 may be configured to estimate temperatures throughout the atmosphere because data from ground radar, airborne radar, ground temperature measurements, weather balloon temperature measurements, and/or any other source of temperature data. Each data entry in temperature data 112 may include a latitude, longitude, altitude, and time. In some examples, temperature data 112 may include the differences in temperature since a previous transmission of temperature data 112 by data source 190 to vehicle 100.

Additionally or alternatively, temperature data 112 may include a forecast of future temperatures at the plurality of locations. For example, temperature data 112 may include the predicted temperatures at the plurality of locations at intervals of fifteen, twenty, or thirty minutes over a time period such as one hour. Data source 190 may be configured to transmit temperature data 112 at a rate such as once or twice per hour. Data source 190 may be configured to increase the rate at which data source 190 in response to determining that there is inclement weather in direction of travel 108 of vehicle 100.

In the example shown in FIG. 1, freezing altitude 160 at the latitude and longitude of vehicle 100 is higher than freezing altitude 160 at the latitude and longitude of location 170. Thus, if the system onboard vehicle 100 used the ambient temperature to estimate freezing altitude 160 at the latitude and longitude of location 170, the system would estimate an altitude that is too high. As a result, the system may determine that there is no potential for icing at location 170 if the altitude of location 170 is much lower than the incorrect estimate of freezing altitude 160.

A system onboard vehicle 100 may be configured to determine that the potential for icing exists at location 170 based temperature data 112 and radar returns received by vehicle 100 from location 170. After determining that the potential for icing exists at location 170, vehicle 100 may be configured to transmit data indicating this determination to vehicle 180 and/or data source 190. The system may be configured to determine which other vehicles are near location 170 or traveling towards location 170. In response to determining that vehicle 180 is near location 170 or is traveling towards location 170, the system may be configured to transmit data indicating the potential for icing at location 170 to vehicle 180. Vehicle 180 may be at risk of encountering icing in examples in which vehicle 180 is located near location 170, and when vehicle 180 is located at an altitude above freezing altitude 160. The icing data may be especially useful in examples in which vehicle 180 is not equipped with an icing detection system.

The system may be configured to determine the potential for icing at location 170 as the likelihood that icing will icing on a vehicle traveling through location 170. The determined potential may be indicative of the concentration and temperature of water at location 170. Alternatively or additionally, the system may be configured to determine a condition that is indicative of the likelihood of icing, such as a temperature and a moisture value, based on temperature data 112 and radar returns. The likelihood that ice crystals are present at location 170 may be expressed as a percentage or with respect to another scale, such as zero to ten or some other number. For example, the categories of icing potential may include none, low, moderate, high, and very high.

Figure 2:
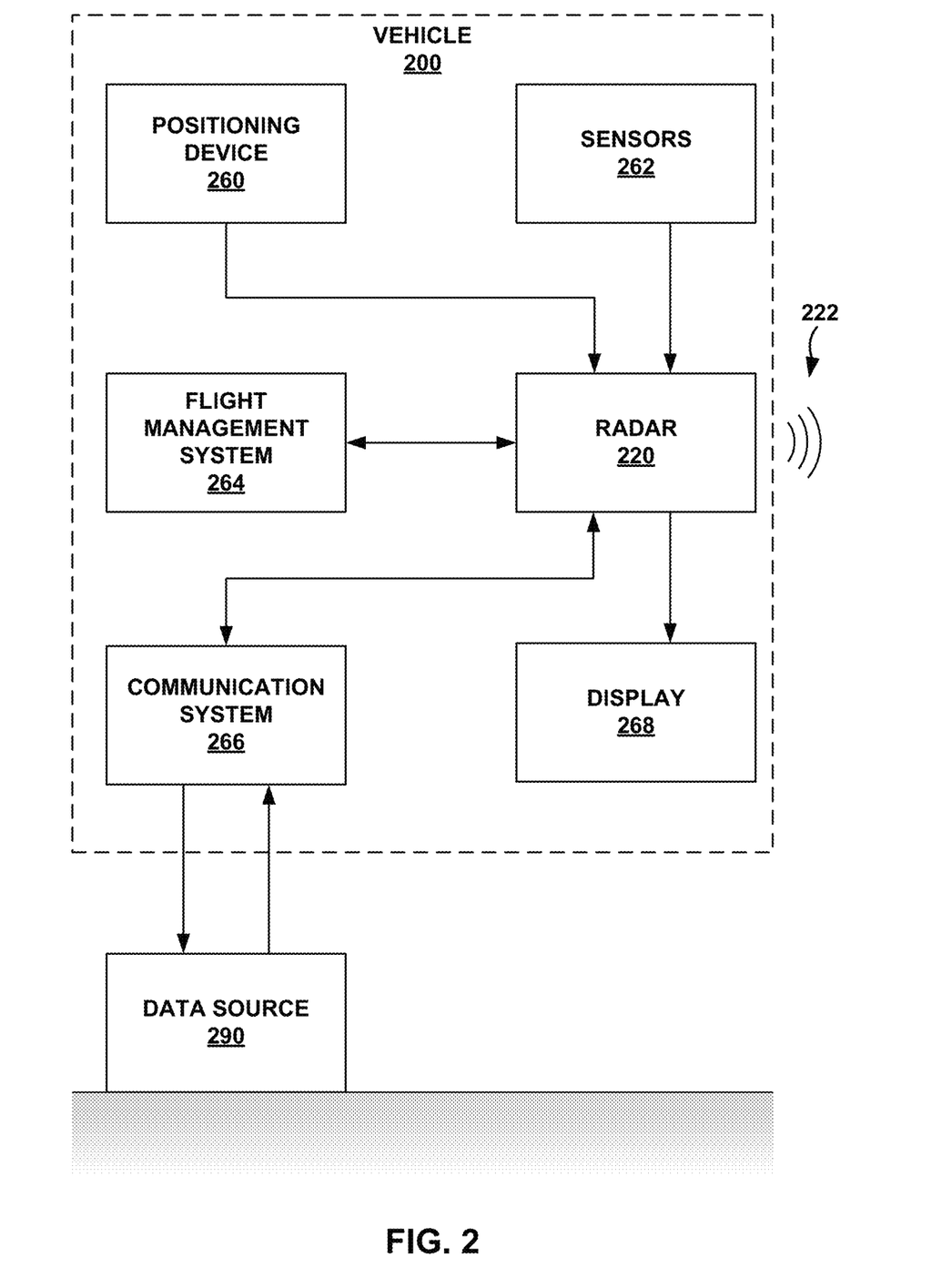
FIG. 2 is a conceptual block diagram of the systems onboard a vehicle, in accordance with some examples of this disclosure.

FIG. 2 is a conceptual block diagram of the systems onboard a vehicle 200, in accordance with some examples of this disclosure. Vehicle 200 may represent one example of vehicle 100 shown in FIG. 1. Radar 220, positioning device 260, sensors 262, flight management system 264, communication system 266, and display 268 are mounted onboard vehicle 200. FIG. 2 shows some connections in vehicle 200, but other connections are possible, such as a connection between flight management system 264 and display 268 or connection between a user interface and radar 220 or flight management system 264.

Radar 220 is configured to emit radar signals 222 and receive reflections of the radar signals. The reflections received by radar 220 may indicate the positions of objects, moisture, weather conditions, terrain, and so on. Radar 220 may be configured to determine a moisture value for a region of airspace based on the electromagnetic power reflected back from that region. Radar 220 may have three-dimensional detection capabilities, such that radar 220 can generate a three-dimensional array of moisture values for a region of airspace. Although radar 220 is described as performing the techniques of this disclosure, other systems such as flight management system 264, communication system 266, or a terrain awareness and warning system may be configured to perform these techniques.

Positioning device 260 is configured to determine the position or location of vehicle 200. Positioning device 260 may include satellite navigation equipment such as a GNSS configured to receive positioning signals from satellites and other transmitters. One example of a GNSS is a Global Positioning System (GPS). Using the determined absolute position of vehicle 200 and the relative position of a region of airspace, radar 220 can determine the absolute position of the region of airspace. The temperature data received from data source 290 may be referenced to absolute positions (e.g., latitude and longitude), and the moisture values determined by radar may be referenced to relative positions (e.g., range, tilt, and azimuth).

Sensors 262 may include a temperature sensor for sensing the ambient temperature outside vehicle 200. Sensors 262 may also include an inertial navigation system for determining the velocity and/or orientation of the ownship vehicle. To determine the orientation of the ownship vehicle, sensors 262 or flight management system 264 may be configured to determine the pitch, roll, and yaw of the ownship vehicle. In some examples, sensors 262 or flight management system 264 can also determine the relative position of the ownship vehicle using dead reckoning. Sensors 262 may also include one or more accelerometers (angular and/or linear accelerometers), one or more gyroscopes, one or more magnetic sensors, one or more speed sensors, and/or an altimeter. Radar 220 may be configured to use data from positioning device 260 and/or sensors 262 to determine the absolute direction from which reflected radar signals are received by radar 220.

Flight management system 264 may be configured to receive user input indicating a travel plan for vehicle 200. Flight management system 264 may be configured to determine a travel path from the current position of vehicle 200 to a destination. Flight management system 264 can provide data relating to the travel path for vehicle 200 to radar 220 and/or communication system 266 so that vehicle 200 can request temperature data for locations along the travel path from data source 290.

Communication system 266 may be configured to communicate with data source 290 via a controller-pilot data link. Communication system 266 may include a receiver for receiving temperature data and/or a transmitter for transmitting data or requests. For example, communication system 266 may be configured to request temperature data from data source 290 and receive the temperature data when communication system 266 can also receive a clearance from data source 290, where the clearance instructs vehicle 200 how to operate (e.g., change course, change altitude, and/or change speed).

Display 268 may be configured to present a graphical user interface indicating radar data, such as weather data, reflectivity data, obstacles, locations with the potential for icing, and/or freezing altitudes. Display 268 can receive a graphical user interface for presentation from radar 220 or another system onboard vehicle 200. In some examples, display 268 may be configured to present data received from flight management system 264. Display 268 may be mounted in the cockpit of vehicle 200. Display 268 may be configured to allow a user to manually adjust the presentation of information to display other related information, such as the presentation of icing information alongside a backup travel plan.

Figure 3:
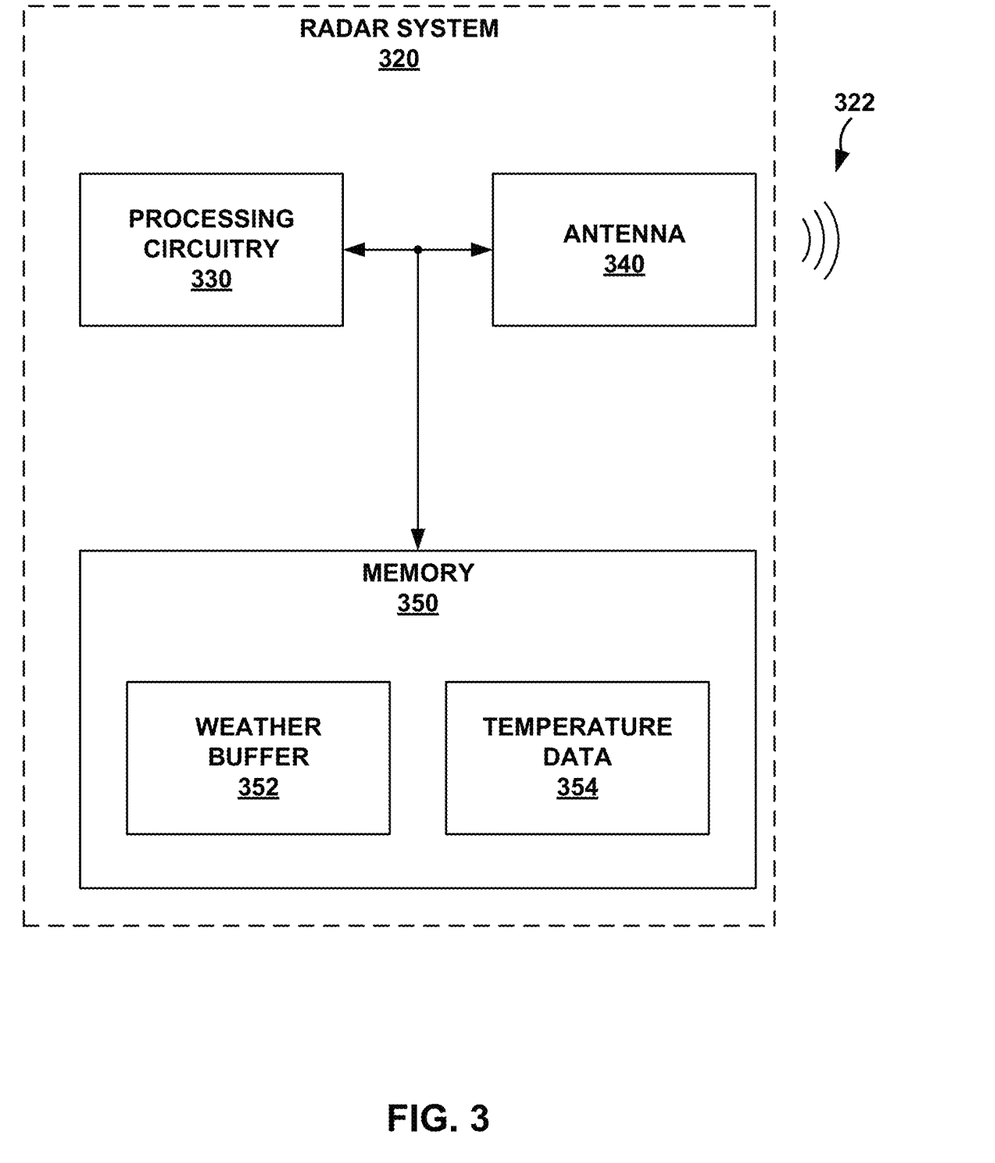
FIG. 3 is a conceptual block diagram of a radar system onboard a vehicle, in accordance with some examples of this disclosure.

FIG. 3 is a conceptual block diagram of a radar system 320 onboard a vehicle, in accordance with some examples of this disclosure. Radar system 320 may represent one example of radar 220 shown in FIG. 2. Radar system 320 may be configured to sense weather conditions and/or obstacles based on the radar returns received by antenna 340.

Processing circuitry 330 may be configured to perform the techniques of this disclosure. For example, processing circuitry 330 may be configured to determine the respective moisture value(s) stored in weather buffer 352 that corresponds to a particular location. Processing circuitry 330 may be configured to also determine the respective temperature (s) in temperature data 354 that corresponds to the particular location. Processing circuitry 330 may be configured to then determine a potential for icing at a location based on a moisture value stored in weather buffer 352 and further based on temperature data 354. Processing circuitry 330 may be configured to generate an output by present an indication of the icing potential via a display and/or by causing a communication system to transmit data indicating the icing potential to an external data source or another vehicle.

Processing circuitry 330 may include any suitable arrangement of hardware, software, firmware, or any combination thereof, to perform the techniques attributed to processing circuitry 330 herein. Examples of processing circuitry 330 include any one or more microprocessors, digital signal processors (DSPs), application specific integrated circuits (ASICs), field programmable gate arrays (FPGAs), or any other equivalent integrated or discrete logic circuitry, as well as any combinations of such components. When processing circuitry 330 includes software or firmware, processing circuitry 330 further includes any hardware for storing and executing the software or firmware, such as one or more processors or processing units. Processing circuitry 330 of an existing radar system may be configured to perform the techniques of this disclosure through reprogramming (e.g., a software update) without any changes to the hardware of the radar system.

Antenna 340 may be configured to transmit radar signals 322 and receive radar returns that reflect back to antenna 340. Additional example details of radar antennas are described in commonly assigned U.S. Pat. No. 9,897,695, entitled "Digital Active Array Radar," which issued on Feb. 20, 2018; U.S. Pat. No. 9,972,917, entitled "Digital Active Array Radar," which issued on May 15, 2018; U.S. Pat. No. 10,725,169, entitled "Integrated Radar and ADS-B," which issued on Jul. 28, 2020; and U.S. Patent Application Publication No. 2019/0113610, entitled "Digital Active Phased Array Radar," which was filed on Feb. 5, 2018, the entire contents of which are incorporated herein.

Memory 350 may be configured to store data, and memory 350 may be communicatively coupled to processing circuitry 330. Memory 350 may include any volatile or non-volatile media, such as a random access memory (RAM), read only memory (ROM), non-volatile RAM (NVRAM), electrically erasable programmable ROM (EEPROM), flash memory, and the like. In some examples, memory 350 may be external to processing circuitry 330 (e.g., may be external to a package in which processing circuitry 330 is housed). Memory 350 may be configured to store weather buffer 352 and temperature data 354.

Weather buffer 352 may include a three-dimensional array of moisture values based on reflected energy received by antenna 340. For example, each value stored to weather buffer 352 may indicate the moisture that is present in a respective region of airspace. The data in weather buffer 352 may be three-dimensional digital data that can be profiled along with freezing altitude data from temperature data 354. The voxels in weather buffer 352 may be associated with locations relative to the ownship vehicle, rather than absolute locations. The center of each voxel may be defined by a range, tilt, and azimuth. The voxel may have dimensions, and voxels that are far away from the ownship vehicle may have larger dimensions that the voxels that are closer to the ownship vehicle.

Temperature data 354 may include recent temperature measurements or estimates of the temperature at a plurality of locations. Additionally or alternatively, temperature data 354 may include predicted temperatures for future times, such ten, twenty, thirty, forty, sixty, or one hundred minutes in the future. Each temperature in temperature data 354 may be associated with a latitude, a longitude, an altitude, and/or a time. The locations of the data points in temperature data 354 may not be identical to the locations of the voxels of weather buffer 352. For example, the resolution of temperature data 354 may be different than the resolution of weather buffer 352. Even if the resolutions of weather buffer 352 and temperature data 354 are the same, the locations in temperature data 354 may be offset from the voxel locations in weather buffer 352. Thus, to determine the potential for icing at a location, processing circuitry 330 may be configured to use one or more moisture values from weather buffer 352 and one or more temperature values from weather buffer 352.

Figure 4:
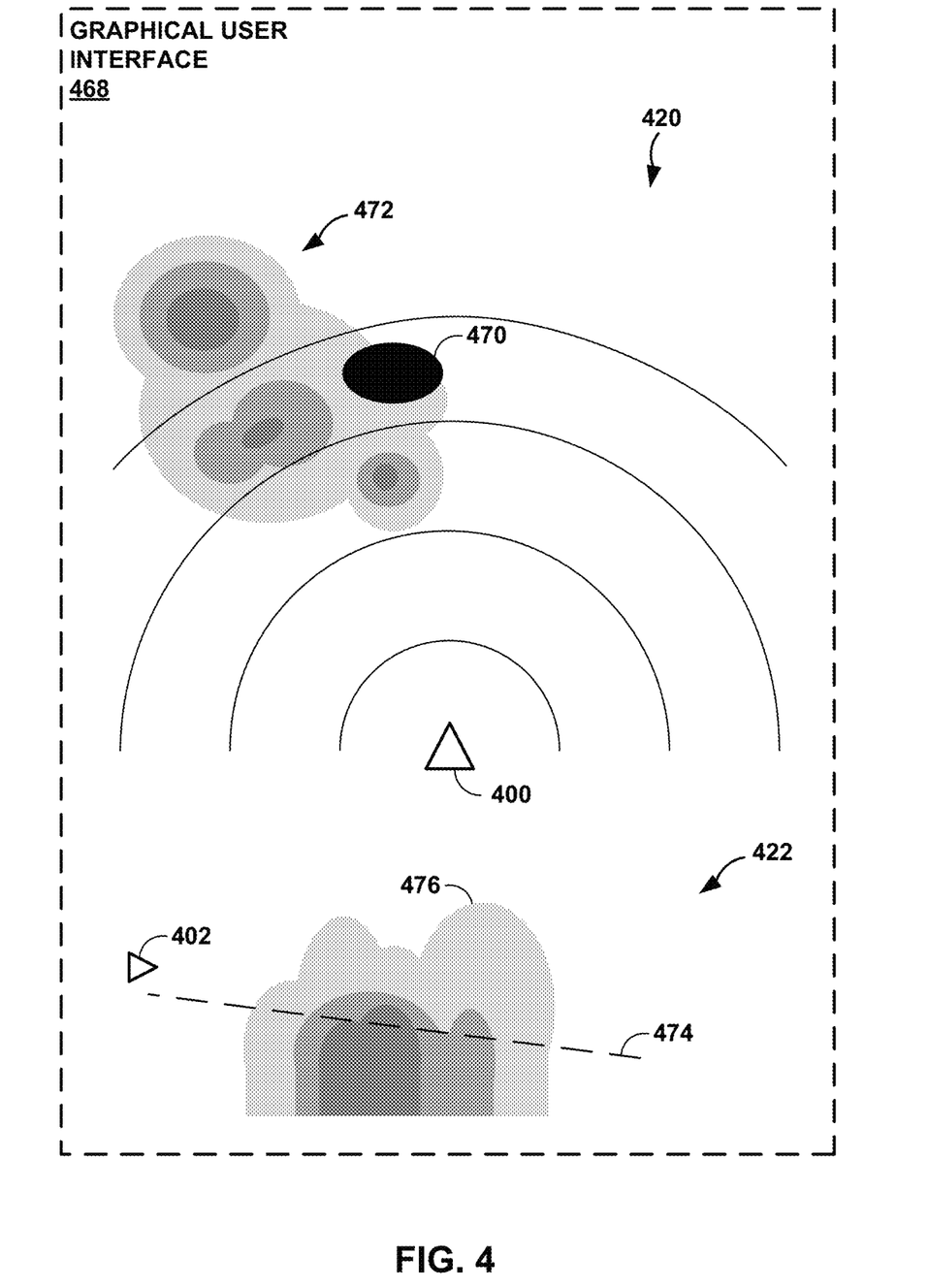
FIG. 4 depicts a graphical user interface including a graphical icons of icing and the freezing altitude, in accordance with some examples of this disclosure.

FIG. 4 depicts a graphical user interface 468 including a graphical icons 470 and 474 of icing and the freezing altitude, in accordance with some examples of this disclosure. Graphical user interface 468 includes plan view graphical representation 420 and vertical profile graphical representation 422. Plan view graphical representation 420 includes ownship graphical icon 400, icing graphical icon 470, weather graphical icon 472. Vertical profile graphical representation 422 includes ownship graphical icon 402, icing graphical icon 474, and weather graphical icon 476. A display may be configured to present graphical user interface 468 to an operator of the ownship vehicle based on data received from a radar system onboard the ownship vehicle.

Figure 5:
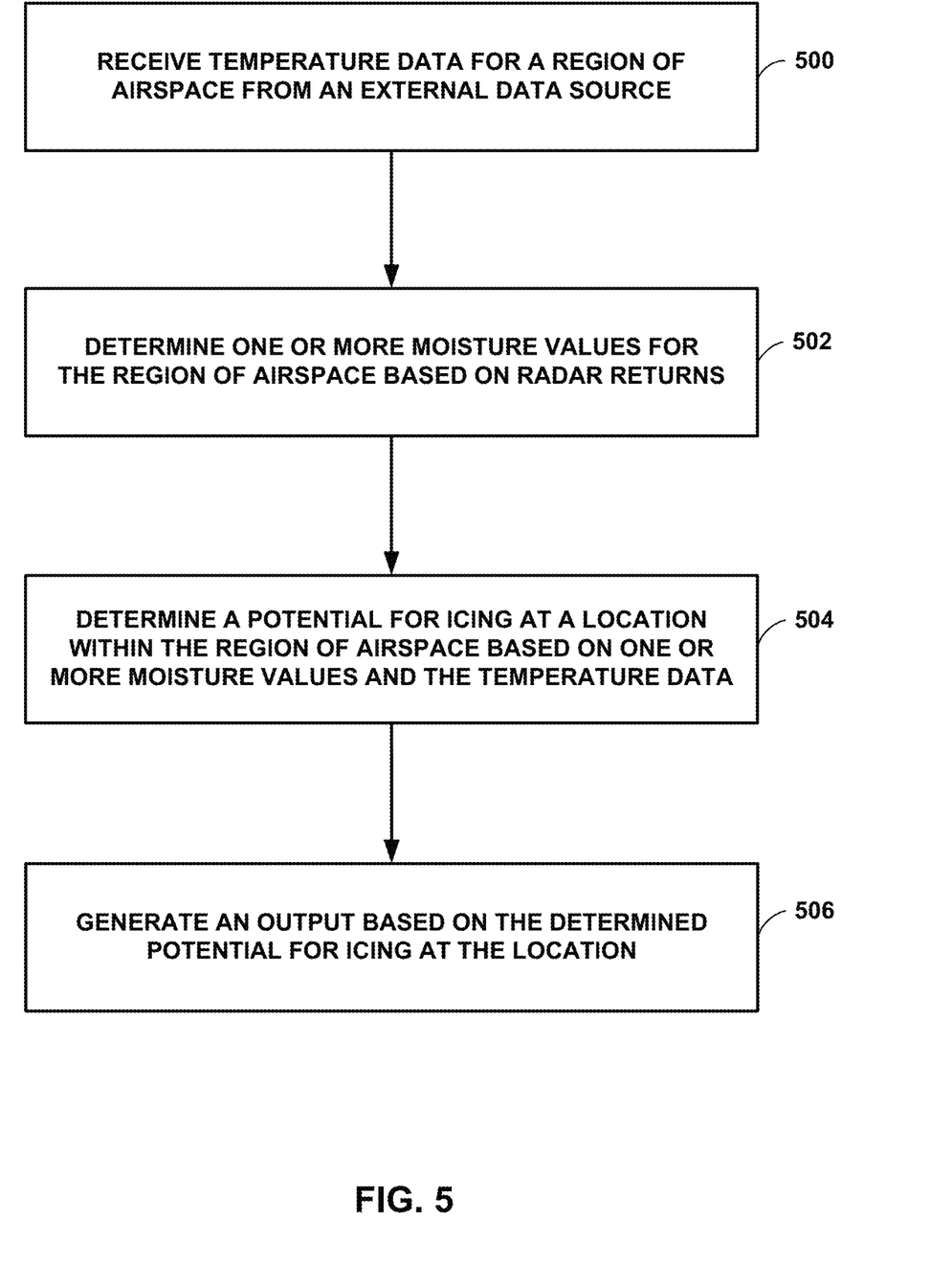
FIGS. 5 and 6 are flowcharts illustrating example processes for determining a potential for icing, in accordance with some examples of this disclosure.
Figure 6:
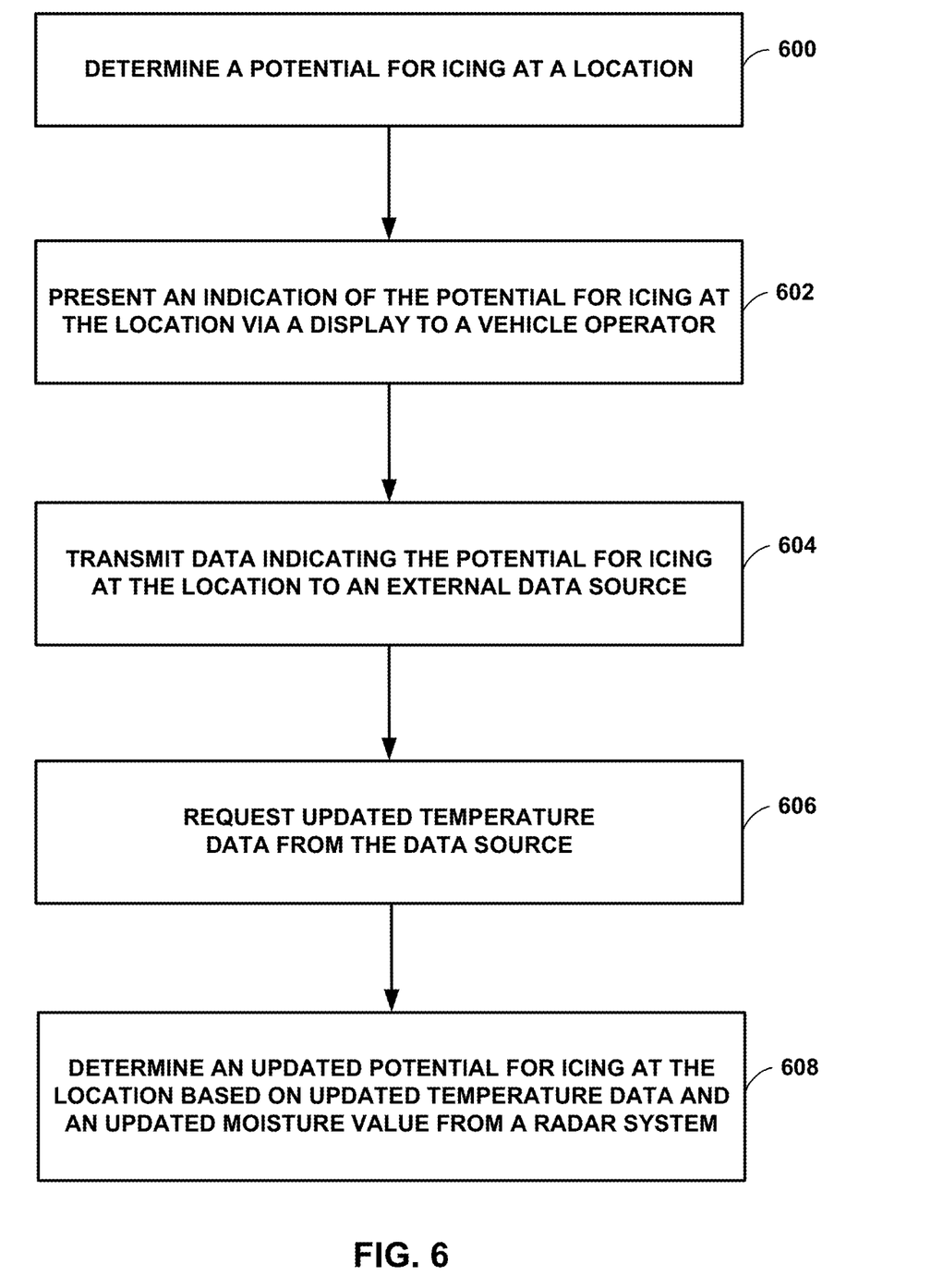

FIGS. 5 and 6 are flowcharts illustrating example processes for determining a potential for icing, in accordance with some examples of this disclosure. The example processes of FIGS. 5 and 6 is described with reference to vehicle 100 shown in FIG. 1, although other components may exemplify similar techniques.

In the example of FIG. 5, vehicle 100 receives temperature data 112 for a region of airspace from data source 190 (500). The region of airspace may include locations in direction of travel 108 of vehicle 100. Data source 190 may be configured to determine direction of travel 108 and the speed of vehicle 100 and use this parameters to determine the dimensions of the region of airspace. Temperature data 112 may include a plurality of temperatures, where each temperature is associated with a location within the region of airspace. Data source 190 may have the capability to upload real-time data to vehicle 100. Data source 190 can transmit temperature data 112 through, for example, a ground-to-air data link.

Vehicle 100 also determines one or more moisture values for the region of airspace (502). A radar system onboard vehicle 100 can determine the moisture values based on radar returns. Vehicle 100 then determines a potential for icing at location 170 based on the one or more moisture values and temperature data 112 (504). The radar system may determine the freezing altitude at the latitude and longitude of location 170. The radar system may be configured to then determine whether location 170 is within a threshold distance from the freezing altitude. For example, the radar system may determine there is a potential for icing by at least determining that the difference between the altitude of location 170 and the freezing altitude is less than three hundred meters, five hundred meters, seven hundred meters, or one kilometer. The determination of the potential for icing may include a determination that the moisture value at location 170 is greater than or equal to a threshold level, and the altitude of location 170 is within a threshold distance of a freezing altitude.

For example, the radar system may be configured to determine that a potential for icing exists at location 170 in response to determining that a moisture value associated with location 170 satisfies a threshold range of values (e.g., a reflectivity exceeding threshold level) and in response to determining that location 170 satisfies a threshold range of altitudes. The radar system may be configured to determine that the potential for icing exists at location 170 in response to determining that location 170 is less than a first threshold distance above the freezing altitude and in response to determining that location 170 is less than a second threshold distance below the freezing altitude, where the first and second threshold distances may be the same or different. The radar system may be configured to determine which height layers or altitudes at the latitude and longitude of location 170 have the potential for icing based on temperature data 112 and the moisture values.

Vehicle 100 generates an output based on the determined potential for icing at location 170 (506). For example, vehicle 100 may be configured to transmit data 114 indicating the potential for icing at location 170 to vehicle 180 and/or data source 190 via a data link. The transmission of data 114 to vehicle 180 and the transmission of data to data source 190 may include icing data, temperature data, weather data, and/or moisture data. Additionally or alternatively, vehicle 100 may be configured to present an indication of the potential for icing at location 170 to an operator of vehicle 100 via a display.

In the example of FIG. 6, vehicle 100 determines a potential for icing at location 170 (600). Vehicle 100 may be configured to determine the potential for icing based on a freezing altitude at the latitude and longitude of location 170, which can be determined from temperature data 112. The determination of the potential for icing may also be based on reflectivity data from a radar onboard vehicle 100. Vehicle 100 then presents an indication of the potential for icing at location 170 via a display to an operator of vehicle 100 (602). Graphical user interface 468 shown in FIG. 4 represents an example of a graphical user interface that can be presented to an operator of vehicle 100. The graphical user interface may include a graphical icon that indicates the location, extent, and severity of the potential for icing. The graphical icon for icing potential can be superimposed on a graphical user interface of weather data, traffic data, and/or terrain data. The graphical user interface may include other data overlapped with the indication of icing potential to help the operator of vehicle 100 make decisions.

Vehicle 100 transmits data indicating the potential for icing at location 170 to data source 190 (604). Vehicle 100 may be configured to also transmit radar data such as moisture values to data source 190. In some examples, vehicle 100 can send the icing data to other stakeholders such as air traffic controllers, airline operational control, or other vehicles. Data source 190 can also share the icing data with other stakeholders. An air traffic control system can use the icing data to optimize travel plans or adjust travel paths to reduce the impact of icing on vehicle travel. Icing data can also be used for refining vehicle maintenance schedules.

Vehicle 100 also sends request 110 for updated temperature data 112 from data source 190 (606). Request 110 may include the most recent location and travel path of vehicle 100. Vehicle 100 then receives the updated version of temperature data 112, which may include current or most recent temperature data and/or forecast data for the near future (e.g., minutes or hours into the future).

Vehicle 100 determines an updated potential for icing at location 170 based on updated temperature data 112 and an updated moisture value from a radar system (608). Vehicle 100 can determine an updated freezing altitude for the latitude and longitude of location 170 based on the updated version of temperature data 112. Vehicle 100 may be configured to present an updated indication of the potential for icing via the display. Although this disclosure describes a radar system as determining the potential for icing at location 170, other systems onboard vehicle 100 such as a flight management system, a communication system, and/or a terrain awareness and warning system may be configured to make this determination.

The following numbered examples demonstrate one or more aspects of the disclosure.

Example 1. A method includes receiving, at a system onboard a vehicle and from a data source external to the vehicle, temperature data for a region of airspace. The method also includes determining, by the system, one or more moisture values for the region of airspace based on radar returns received by a weather radar onboard the vehicle. The method further includes determining, by the system, a potential for icing at a location within the region of airspace based on the one or more moisture values and further based on the temperature data received from the data source. The method includes generating an output based on the determined potential for icing at the location.

Example 2. The method of example 1, where the vehicle is an aircraft.

Example 3. The method of any combination of the preceding examples, further including receiving the temperature data during a flight of the vehicle.

Example 4. The method of the preceding examples or any combination thereof, where generating the output includes causing a transmitter to transmit, to the data source, an indication of the potential for icing at the location.

Example 5. The method of the preceding examples or any combination thereof, where generating the output includes causing a transmitter to transmit, to another vehicle, an indication of the potential for icing at the location.

Example 6. The method of the preceding examples or any combination thereof, where generating the output includes presenting, via a display, an indication of the potential for icing at the location.

Example 7. The method of the preceding examples or any combination thereof, further including requesting the temperature data from the data source before receiving the temperature data.

Example 8. The method of the preceding examples or any combination thereof, further including determining a freezing altitude for a latitude and a longitude of the location based on the temperature data received from the data source.

Example 9. The method of the preceding examples or any combination thereof, further including determining the potential for icing at the location based on the one or more moisture values and further based on the freezing altitude for the latitude and the longitude of the location.

Example 10. The method of the preceding examples or any combination thereof, where determining the potential for icing includes determining that a difference between an altitude of the location and the freezing altitude for the location is less than a threshold altitude difference.

Example 11. The method of the preceding examples or any combination thereof, where determining the potential for icing includes determining that a moisture value associated with the location is greater than a threshold level.

Example 12. The method of the preceding examples or any combination thereof, where the temperature data received from the data source includes three-dimensional temperature data for the region of airspace for a plurality of latitudes, a plurality of longitudes, and a plurality of altitudes.

Example 13. The method of the preceding examples or any combination thereof, where the temperature data received from the data source includes a set of predicted future temperatures for the region of airspace.

Example 14. The method of the preceding examples or any combination thereof, where the processing circuitry is configured to determine potential for icing more than fifty kilometers.

Example 15. A system including a memory and processing circuitry configured to perform the method of the preceding examples or any combination thereof.

Example 16. A system includes a receiver configured to receive temperature data for a region of airspace from a data source external to a vehicle. The system also includes processing circuitry configured to determine one or more moisture values for the region of airspace based on radar returns received by a weather radar onboard the vehicle. The processing circuitry is further configured to determine a potential for icing at a location within the region of airspace based on the one or more moisture values and further based on the temperature data received from the data source. The processing circuitry is also configured to generate an output based on the determined potential for icing at the location.

Example 17. The system of examples 15-16, where the vehicle is an aircraft.

Example 18. The system of examples 15-17 or any combination thereof, where the system is configured to mount on the vehicle.

Example 19. The system of examples 15-18 or any combination thereof, where the receiver is configured to receive the temperature data during a flight of the aircraft Example 20. A device includes a computer-readable medium having executable instructions stored thereon, configured to be executable by processing circuitry for causing the processing circuitry to perform the method of examples 1-14 or any combination thereof.

Example 21. A system includes means for performing each of the method steps of examples 1-14 or any combination thereof.

This disclosure has attributed functionality to vehicles 100 and 200, data source 190, systems 220, 264, 266, and 320, and processing circuitry 330. Some or all of these components may include any combination of integrated circuitry, discrete logic circuitry, analog circuitry. For example, processing circuitry 330 may include one or more processors. In some examples, processing circuitry 330 may include multiple components, such as any combination of one or more microprocessors, one or more DSPs, one or more ASICs, or one or more FPGAs, as well as other discrete or integrated logic circuitry, and/or analog circuitry. The techniques described in this disclosure may also be encoded in a non-transitory computer-readable storage medium, such as a memory mounted onboard vehicle 100 and/or in the cloud. The term "non-transitory" may indicate that the storage medium is not embodied in a carrier wave or a propagated signal. In certain examples, a non-transitory storage medium may store data that can, over time, change (e.g., in RAM or cache).

Various examples of the disclosure have been described. Any combination of the described systems, operations, or functions is contemplated. These and other examples are within the scope of the following claims.

What is claimed is:

1. A system configured to mount on a vehicle, the system comprising:
a receiver configured to receive temperature data for a region of airspace from a data source external to the vehicle,
wherein the region of airspace includes a location; and
wherein the location is a point in space defined by a latitude, a longitude, and an altitude; and
processing circuitry configured to:
determine one or more moisture values for the region of airspace based on radar returns received by a weather radar onboard the vehicle;
determine a freezing altitude for the latitude and the longitude of the location based on the temperature data received from the data source;
determine a potential for icing at the location based on the one or more moisture values for the location, and further based on the temperature data received from the data source by:
determining that a difference between an altitude of the location and the freezing altitude for the location is less than a threshold altitude difference; and
determining that a moisture value associated with the location is greater than a threshold level; and
generate an output based on the determined potential for icing at the location.

2. The system of claim 1,
wherein the vehicle is an aircraft, and
wherein the receiver is configured to receive the temperature data during a flight of the aircraft.

3. The system of claim 1, further comprising a transmitter, wherein to generate the output, the processing circuitry is configured to cause the transmitter to transmit, to the data source, an indication of the potential for icing at the location.

4. The system of claim 1, further comprising a transmitter, wherein to generate the output, the processing circuitry is configured to cause the transmitter to transmit, to another vehicle, an indication of the potential for icing at the location.

5. The system of claim 1, wherein to generate the output, the processing circuitry is configured to present, via a display, an indication of the potential for icing at the location.

6. The system of claim 1, wherein the processing circuitry is configured to estimate the freezing altitude for the location based on a lapse rate and the temperature data received from the data source.

7. The system of claim 1, wherein the temperature data received from the data source comprises three-dimensional temperature data for the region of airspace for a plurality of latitudes, a plurality of longitudes, and a plurality of altitudes.

8. The system of claim 1, wherein the temperature data received from the data source comprises a set of predicted future temperatures for the region of airspace.

9. The system of claim 1, wherein the processing circuitry is configured to determine potential for icing more than fifty kilometers.

10. A method comprising:
receiving, at a system onboard a vehicle and from a data source external to the vehicle, temperature data for a region of airspace,
wherein the region of airspace includes a location; and
wherein the location is a point in space defined by a latitude, a longitude, and an altitude;
determining, by the system, one or more moisture values for the region of airspace based on radar returns received by a weather radar onboard the vehicle;
determining, by the system, a freezing altitude for a latitude and a longitude of the location based on the temperature data received from the data source;
determining, by the system, a potential for icing at a location within the region of airspace based on the one or more moisture values and further based on the temperature data received from the data source, by;
determining that a difference between an altitude of the location and the freezing altitude for the location is less than a threshold altitude difference; and
determining that a moisture value associated with the location is greater than a threshold level; and
generating an output based on the determined potential for icing at the location.

11. The method of claim 10,
wherein the vehicle is an aircraft, and
wherein receiving the temperature data comprises receiving the temperature data during a flight of the aircraft.

12. The method of claim 10, wherein generating the output comprises transmitting, by the system and to the data source, an indication of the potential for icing at the location.

13. The method of claim 10, wherein generating the output comprises transmitting, by the system and to another vehicle, an indication of the potential for icing at the location.

14. The method of claim 10, wherein generating the output comprises presenting, via a display onboard the vehicle, an indication of the potential for icing at the location.

15. The method of claim 10, further comprising requesting the temperature data from the data source before receiving the temperature data.

16. The method of claim 10, wherein the location is more than fifty kilometers from the vehicle.

17. A device comprising a computer-readable medium having executable instructions stored thereon, configured to be executable by processing circuitry for causing the processing circuitry to:
determine, based on radar returns received by a radar system onboard a vehicle, one or more moisture values for a region of airspace,
wherein the region of airspace includes a location; and
wherein the location is a point in space defined by a latitude, a longitude, and an altitude;
determine a potential for icing at a location within the region of airspace based on the one or more moisture values and further based on temperature data received by the radar system from a data source external to the vehicle, by:
determining that a difference between an altitude of the location and a freezing altitude for the location is less than a threshold altitude difference; and
determining that a moisture value associated with the location is greater than a threshold level; and
generate an output based on the determined potential for icing at the location.

18. The device of claim 17, wherein the instructions to generate the output comprise instructions to:
   present, via a display, a first indication of the potential for icing at the location; and
   transmit, to the data source, a second indication of the potential for icing at the location.

\* \* \* \* \*